United States Patent [19]
Fabula

[11] 3,884,173
[45] May 20, 1975

[54] SUPPRESSION OF CABLE STRUMMING VIBRATION BY A RIDGED CABLE JACKET

[75] Inventor: Andrew G. Fabula, La Jolla, Calif.

[73] Assignee: The United States of America as represented by the Secretary of the Navy, Washington, D.C.

[22] Filed: July 12, 1974

[21] Appl. No.: 487,832

[52] U.S. Cl. ............ 114/235 F; 174/42; 174/70 R; 174/119 R; 188/1 B; 340/3 T
[51] Int. Cl. ...... B63b 21/56; H01b 7/04; H02g 7/14
[58] Field of Search ...... 174/42, 70 R, 70 A, 101.5, 174/113 R, 113 AS, 117 R, 117 AS, 27, 28, 174/29; 57/144, 160; 73/147; 114/235 B, 235 F; 188/1 B; 244/1 R, 113, 130, 40 A, 41; 340/3 T

[56] References Cited
UNITED STATES PATENTS

| | | | |
|---|---|---|---|
| 1,307,995 | 6/1919 | Armor | 174/70 A X |
| 3,076,533 | 2/1963 | Scruton et al. | 73/147 X |
| 3,368,514 | 2/1968 | Kelly | 114/235 F |
| 3,454,051 | 7/1969 | Goepfert et al. | 138/178 |
| 3,573,348 | 4/1971 | Herrmann | 174/101.5 |
| 3,581,449 | 6/1971 | Huber et al. | 52/84 |

FOREIGN PATENTS OR APPLICATIONS

| | | | |
|---|---|---|---|
| 553,645 | 1/1957 | Belgium | 174/117 R |
| 519,937 | 3/1955 | Italy | 174/27 |
| 645,313 | 9/1962 | Italy | 174/128 |

*Primary Examiner*—Laramie E. Askin
*Attorney, Agent, or Firm*—Richard S. Sciascia; Ervin F. Johnston; William T. Skeer

[57] ABSTRACT

An apparatus for the attenuation of motion induced, spurious, hydrophone signals resulting from cable vibrations induced by relative water flow motions over the cable, which are transferred to a hydrophone attached thereto, includes a radially outstanding and spirally disposed ridge or ridges running over that length of the cable that is exposed to flow with a sizeable cross-flow component.

20 Claims, 6 Drawing Figures

PATENTED MAY 20 1975 3,884,173

SUPPRESSION OF CABLE STRUMMING VIBRATION BY A RIDGED CABLE JACKET

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of oceanography and marine engineering. More particularly, the invention pertains to the field of oceanographic instrumentation. In still greater particularity, this invention pertains to mechanically supporting oceanographic instruments beneath the surface of a body of water.

DESCRIPTION OF THE PRIOR ART

As man masters his ocean environments, the necessity of employing oceanographic instrumentation of ever increasing sensitivity has become exceedingly important. As the oceanographic instruments deployed in the world's oceans have become more sensitive, they have uncovered serious problems attributed to mechanical interaction between the instruments and their support systems. In general, hydrophones suspended beneath the surface of the ocean on oceanographic cables are affected by relative water motions which act on the mechanical suspension system. These water motions are present in all common methods of deploying these instruments. For example, systems which are moored in place are subject to ocean currents in the locale of the mooring. Similarly, systems which are supported from surface buoys and allowed to drift with the ocean currents experience differential currents and any currents throughout the length of the suspension system. Finally, systems which are towed by tractor vehicles, either aircraft, surface vessels, or submarine vessels, experience even greater mechanical interactions. The most prevalent type of mechanical interaction is known as strumming and is a phenomenon similar to the well understood resonant tensioned strings as used on musical instruments.

This strumming occurs by the current passing about the cable forming a succession of fluid eddies or vortexes on the lee side of the cable. Each vortex gives rise to a pressure differential on the side of the cable causing a transverse mechanical displacement of the cable which, in turn, enhances the formation of the next vortex and so on. The organized or coherent action of vortex shedding along a sufficient length of cable is believed to be a primary requirement for the cable strumming vibration.

Prior attempts to overcome these deleterious effects of moving current have included the addition of resonant masses and isolating mountings such as shown in U.S. Pat. No. 3,354,860 to J. R. Dale et al issued on Nov. 28, 1967 for "Mechanical Isolation of Hydrophones by Hydroplanes." Other attempts employ coverings and fairings fitted over the instrument support cable. An example of such a system is shown in U.S. Pat. No. 3,443,020 issued to H. H. Loshigin on May 6, 1969 for "Faired Cable."

Although the aforedescribed systems have met with qualified success, they are difficult to stream and recover from standardly equipped oceanographic vessels. That is, special winches and handling gear must be employed. Even the most successful of the prior art arrangements, represented by U.S. Pat. No. 3,368,514 issued on Feb. 13, 1968 to Raymond E. Kelly for "Symmetrical Self-Aligning Cable Fairing" is difficult to pay out and recover from standard shipboard cable handling equipment after long periods of storage. Further, such cables require enlarged reeves and special streaming gear.

The design of oceanographic and marine cabling remains a somewhat empirical art despite considerable research efforts. Therefore, a great many ostensibly promising designs have been confidently purposed, expeditiously made, expectantly tried, and quietly dropped from further consideration. The difference between a successful design and one which is unreliable in performance is, in many instances, a small physical difference which may seem trivial to those who have not experienced, first-hand, the results made possible thereby.

SUMMARY OF THE INVENTION

This invention overcomes the aforedescribed difficulties of the prior art by the provision of an oceanographic cable which may be streamed and recovered by conventional oceanographic gear and which is of low cost to procure. The invention is characterized by providing one or more radially extending ridges which are spirally disposed along the length of the cable. The ridge or ridges act as a flow spoiler and prevent coherent shedding of vortexes and thereby suppress to a major degree the cable strumming vibration.

It is believed that this suppression is achieved by the action of the spiral ridge to control the point of flow separation when the ridge is well exposed to the flow on the side of the cable, and its lack of effect when the ridge is on the front or back side of the cable relative to the flow. Since the coherent wandering about the circumference of the flow-separation points on the two sides of the cable is apparently important to coherent vortex-shedding, the spiral ridges act to disrupt that coherence by fixing the flow separation points at some locations and not fixing it at others in between.

STATEMENT OF THE OBJECTS OF THE INVENTION

Accordingly, it is an object of this invention to provide an improved oceanographic cable.

Another object of this invention is to provide an oceanographic cable which will be free of mechanical vibrations and hydromechanical resonances.

A further object of this invention is to provide an oceanographic cable which minimizes cable strumming.

Another object of this invention is to provide an oceanographic cable having a flow spoiler thereon to prevent coherent vortex shedding.

Still another object of this invention is the provision of an oceanographic cable having one or more spirally disposed ridges extending over the length thereof which is exposed to cross flow.

Still another object of this invention is to provide a non-strumming, oceanographic cable having a metallic tension transmission means.

A still further object of this invention is to provide a non-strumming, oceanographic cable having electrical conductors enclosed therein.

These and other objects of the invention will become more readily apparent from the ensuing specification when taken together with the drawings.

DESCRIPTION OF THE PREFERRED EMBODIMENT

Figure 1:
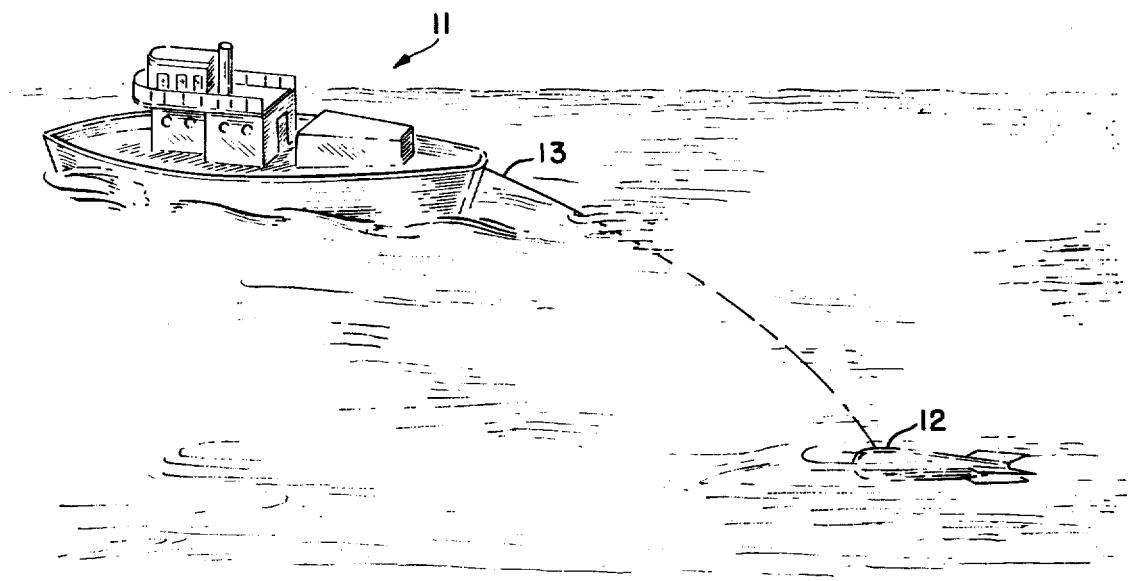
FIG. 1 is a perspective view showing the invention in operational environment.

Referring to FIG. 1, an oceanographic vessel 11 is shown towing an oceanographic instrument package 12 attached to the distal end of cable 13. Oceanographic vessel 12 is shown as a surface ship, but it should be understood that other tractor vehicles may be used in deployment of cable 13 and oceanographic package 12. Such alternate tractor ships may include aircraft of both the fixed and rotary wing configurations, surface effect vehicles and submarine vehicles. Similarly, as noted previously, cable 13 may be used with fixed, moored installations as well as buoy suspended instrument packages. Similarly, it should be obvious that although a single instrument package 12 is shown as deployed from cable 13, a plurality of such instrument packages may be used if desired.

Figure 2:
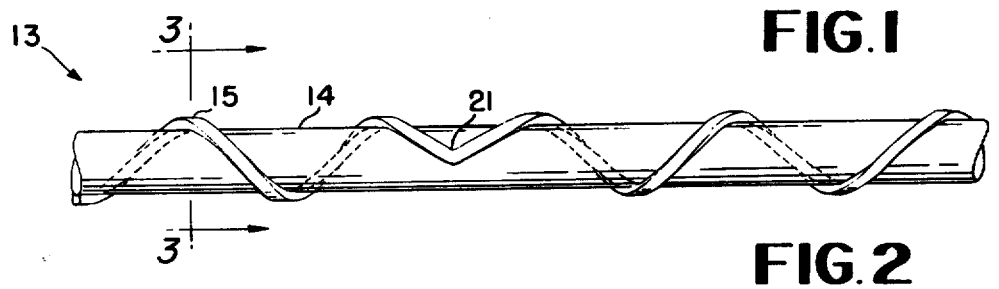
FIG. 2 is an elevational view of a length of oceanographic cable according to the invention.

Referring to FIG. 2, a length of cable 13 is illustrated in a larger scale such that the constructional features become more apparent. As shown, cable 13 has a generally cylindrical, smooth outer surface 14. Although described as essentially smooth, surface 14 may, of course, include such texture and surface irregularities as is common in dependence upon the material from which it is made. As shown, a ridge 15 extends radially outwardly from the surface 14 and is disposed spirally about the length of cable 13. Ridge 15 is ordinarily molded as part of the external covering of cable 14, however, other methods of attachment are possible such that ridge 15 may be put on existing cables when such installation is justified by replacement cost considerations. A variety of techniques are available to facilitate this installation including a cementitious bond or the application of an adhesive tape.

The height to which the spoiler ridge 15 extends above the surface of cable 13 depends on a variety of considerations including the intended towing speed and depth. However, typically a satisfactory range of heights would extend between 15 and 35 percent of the diameter of cable 13.

Figure 3:
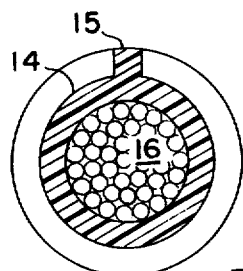
FIG. 3 is a sectional view taken along lines 3—3 of FIG. 2.

Referring to FIG. 3, a sectional representation of cable illustrated in FIG. 2 is presented. In this illustration, the ridge has an essentially square cross section, with equal height and width and with square outer corners and with no filleting of the inner corners. This showing is for purposes of illustration clarity and other ridge cross sections, with unequal height and width and with rounding of the outer corners and filleting of the inner corners, are envisioned to facilitate manufacture and reduce wear due to normal use.

Figure 4:
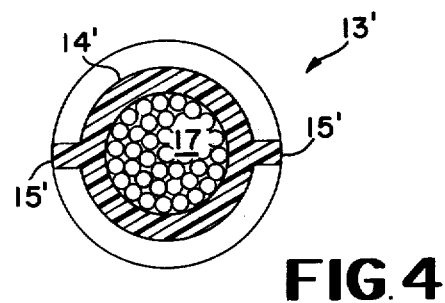
FIG. 4, FIG. 5, and FIG. 6 are similar sectional views showing constructional variations of the invention.

As indicated, the central core of cable 13 may be a woven wire rope of conventional manufacture. As used herein the term wire rope encompasses all woven or braided metallic cables designed for bearing tension loads. Such cables have extremely high tensile strength and their use in the oceanographic arts is well understood. However, when the presence of such a metallic interior would have a deleterious effect upon the oceanographic measurements, as might be the case when the towed instrument package included, for example, a magnetometer, a nonmetallic center may be employed. Such a nonmetallic center is illustrated in FIG. 4 in which the center strain carrying means comprises a nylon rope 17. As in the case of wire rope 16, nylon rope 17 is merely exemplary of many nonmetallic textile tension bearing members and may include braided, woven, and twisted filaments.

Also shown in FIG. 4 is an alternate construction for the helical spoiler ridge. As shown, a pair of opposed ridges 15' spaced 180° apart circumferentially are employed to extend in a spiral helix about the outer surface of covering 14' on cable 13'. Such an alternate construction may be useful to allow reduction of the pitch or height of the helical ridge to facilitate cable manufacture and handling or to reduce sensitivity of performance caused by ridge drainage occasioned by shipboard use.

The use of multiple ridges is not limited to the pair illustrated in FIG. 4, and use of three or four symmetrically placed ridges is also considered. For example, as shown in FIG. 5, an oceanographic cable 13'' may employ three symmetrically disposed ridges 15'' spaced 120° apart and extending outwardly from the cover 14'' of the cable.

Figure 5:
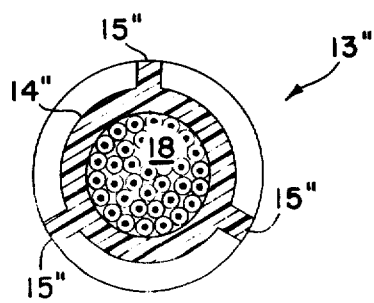

FIG. 5 also shows an alternate construction for the central strain carrying means in that this means may comprise a plurality of insulated electrical conductors. This arrangement is particularly convenient when oceanographic instrument package 12 includes devices whose output is connected to shipboard equipment. Such equipment may, for example, include hydrophones or acoustic generating means. Similarly, other electrical conductors may carry control signals to operate electrical apparatus carried in instrumentation package 12.

Figure 6:
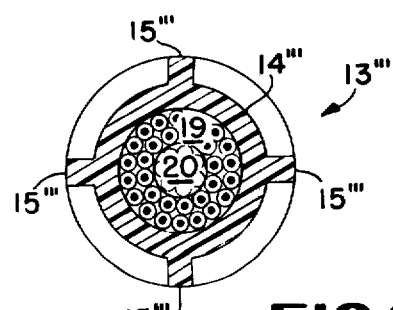

Referring to FIG. 6, a logical development of the aforedescribed cable variations is illustrated. A cable 13''' has an outer covering 14''' having an essentially smooth outer surface. Four ridges extending outwardly therefrom and located at 90° from each other are indicated at 15'''. The central portion of cable 13''' includes a plurality of insulated electrical conductors 19 which are circumferentially disposed about a central strain transmitting member 20. Strain transmitting member 20 may be either a wire rope similar to wire rope 16 but of a smaller diameter or, alternatively, a nylon or textile rope similar to that illustrated in FIG. 4. Such composite cables are relatively common in the oceanographic arts and for an exemplary construction thereof attention is invited to U.S. Pat. No. 3,458,855 (FIG. 7), issued July 29, 1969 to A. E. Wallen.

If helical ridges 15 were configured to have the same pitch direction throughout the length of cable 13, the fluid motions thereabout would cause the cable to "kite" or tow to the side of the line of motion and would also exert a torque on the cable which would be transmitted to oceanographic instrument package 12. Therefore, at predetermined lengths along the cable, the direction of the helical pitch is reversed on cables where such "kiteing" is undesirable. Such a reversal point is illustrated at 21 in FIG. 2.

Likewise, ridges 15 may only be placed on that portion of cable 13 which is exposed to cross-flow. That is, if a significant portion of cable 13 is to be streamed parallel to the surface, the ridges may be omitted along that particular portion.

The precise pitch of the radially protruding spoiler ridge 15 is dependent upon the number of such ridges and the anticipated current velocities. As a typical lower limit, a single turn need occupy a length no shorter than five diameters of outer covering 14. However, some applications may use an even lower ratio. Thus, a one inch cable 14 might have a helical ridge having a radial height of one quarter of an inch and complete a single turn about the cover in a length of 5 or more inches. On such a cable, the direction of the helical pitch would be reversed approximately once every 10 feet. Of course, other pitches may be used and, too, a ridge may vary in pitch along its course.

Normally, outer covering 14 is made of a plastic material which is molded on the central core as the central core is extruded through appropriate forming die. Thus, by the known process of oscillating this die as cable 13 emerges therefrom, the pitch and direction reversal of spoiler ridge 15 may be conveniently controlled. Of course, as used herein the term plastic refers to the physical properties of the material as being pliable, flexible, and water impervious and, quite naturally, natural as well as synthetic materials may be used for this purpose.

From the foregoing description, it may be readily seen that this invention is an improved construction of oceanographic hardware which performs in an improved fashion to meet the objects of the invention. Further, this device, although of simple construction, was unknown prior to the disclosure herein presented and, accordingly, unobvious to a person familiar with the technical fields encompassed thereby. However, the foregoing disclosure taken together with the appended claims and drawings constitutes a disclosure sufficient to permit such an artisan to make and use the device and to realize the improved performance made possible thereby.

Obviously, many modifications and variations of the present invention are possible in the light of the above teachings, and, it is therefore understood that within the scope of the disclosed inventive concept, the invention may be practiced otherwise than specifically described.

What is claimed is:

1. In an oceanographic system for deployment in an ocean environment which includes:
   a surface station for operation at the surface of the ocean environment,
   winch means mounted on said surface station,
   an oceanographic transducer configured for remote location with respect to said surface station and for towing beneath the surface of said ocean environment,
   the improvement comprising:
   a flexible, antistrumming, oceanographic cable connected between said winch means and said oceanographic transducer for controlling the relative position therebetween, said flexible antistrumming, oceanographic cable including;
   a central, strain-carrying means for transmission of tensional loads along the longitudinal axis of said flexible, antistrumming, oceanographic cable,
   an essentially smooth, external covering means surrounding said central strain-carrying means and effectively joined thereto for protecting said central strain-carrying means and for facilitating reeving and handling of the oceanographic cable by said winch means, and
   a spoiler means effectively attached to said essentially smooth, external covering means and extending radially outward therefrom between 15 and 35 percent of the diameter of the oceanographic cable and spirally disposed with a pitch which reverses itself in direction at predetermined intervals along the length thereof for modifying the cross-flow of fluids about the external surface of said flexible, antistrumming oceanographic cable.

2. An oceanographic system according to claim 1 in which said external covering means is a plastic coating.

3. An oceanographic system according to claim 2 in which said spoiler means is integrally formed with said covering means.

4. An oceanographic system according to claim 3 in which said spoiler means has a spiral pitch of greater than one turn in a length corresponding to five diameters of the oceanographic cable.

5. An oceanographic system according to claim 4 in which said spoiler means includes a single radially extending, spirally disposed member.

6. An oceanographic system according to claim 4 in which said spoiler means includes two radially extending, spirally disposed members spaced 180° apart circumferentially.

7. An oceanographic system according to claim 4 in which said spoiler means includes three radially extending and spirally disposed members spaced 120° apart circumferentially.

8. An oceanographic system according to claim 4 in which said spoiler means includes four radially extending and spirally disposed members spaced 90° apart circumferentially.

9. An oceanographic system according to claim 4 in which said central strain carrying means includes a flexible, metallic member.

10. An oceanographic system according to claim 4 in which said central strain carrying means includes a flexible, nonmetallic member.

11. An oceanographic system according to claim 4 in which said central strain carrying means includes insulated electrical conductor means.

12. An oceanographic system according to claim 1 in which said spoiler means is integrally formed with said covering means.

13. An oceanographic system according to claim 1 in which said spoiler means has a spiral pitch of greater than one turn in a length corresponding to five diameters of the oceanographic cable.

14. An oceanographic system according to claim 1 in which said spoiler means includes a single radially extending, spirally disposed member.

15. An oceanographic system according to claim 1 in which said spoiler means includes two radially extending, spirally disposed members spaced 180° apart circumferentially.

16. An oceanographic system according to claim 1 in which said spoiler means includes three radially extending and spirally disposed members spaced 120° apart circumferentially.

17. An oceanographic system according to claim 1 in which said spoiler means includes four radially extending and spirally disposed members spaced 90° apart circumferentially.

18. An oceanographic system according to claim 1 in which said central strain carrying means includes a flexible, metallic member.

19. An oceanographic system according to claim 1 in which said central strain carrying means includes a flexible, non-metallic member.

20. An oceanographic system according to claim 1 in which said central strain carrying means includes insulated electrical conductor means.

* * * * *